(12) United States Patent
Kelin et al.

(10) Patent No.: US 8,446,984 B2
(45) Date of Patent: May 21, 2013

(54) METHOD AND SYSTEM FOR IDENTIFICATION OF PORTABLE ANTENNA MODULES

(75) Inventors: Timur G. Kelin, Moscow (RU); Nikolay A. Vazhenin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 308 days.

(21) Appl. No.: 13/001,139

(22) PCT Filed: May 19, 2010

(86) PCT No.: PCT/RU2010/000250
§ 371 (c)(1),
(2), (4) Date: Dec. 23, 2010

(87) PCT Pub. No.: WO2011/126393
PCT Pub. Date: Oct. 13, 2011

(65) Prior Publication Data
US 2011/0243274 A1    Oct. 6, 2011

(30) Foreign Application Priority Data
Apr. 5, 2010    (RU) .............................. 2010112958

(51) Int. Cl.
*H03D 3/00* (2006.01)
*H03K 9/06* (2006.01)

(52) U.S. Cl.
USPC ............ 375/322; 375/318; 375/340; 375/224

(58) Field of Classification Search
USPC ......................................... 375/318, 224, 322
See application file for complete search history.

(56) References Cited

U.S. PATENT DOCUMENTS

| | | | |
|---|---|---|---|
| 7,593,484 B2 * | 9/2009 | Beamish et al. | 375/318 |
| 2009/0251372 A1 * | 10/2009 | Degner et al. | 343/702 |
| 2009/0257482 A1 * | 10/2009 | Beyer et al. | 375/224 |

FOREIGN PATENT DOCUMENTS

| | | |
|---|---|---|
| EP | 1 056 039 | 11/2000 |
| RU | 2 314 640 | 10/2008 |

* cited by examiner

*Primary Examiner* — Daniel Washburn
*Assistant Examiner* — Qutbuddin Ghulamali
(74) *Attorney, Agent, or Firm* — Bardmesser Law Group

(57) ABSTRACT

Antenna identification data is transferred over a regular channel that is normally used for transferring navigation signals. Modulation of the received signal is used for transferring the portable antenna parameter data. Antenna identifications and parameters are written into a portable antenna module. The antenna module is attached to a radio receiver. The antenna module and the receiver are powered up. The portable antenna module receives radio signals that are amplified in a low-noise amplifier. Then, a level of the output signal is discretely modulated in the amplitude modulator and the signal is transferred to the radio receiver. The discrete fluctuations of the level of the signal are determined in the amplitude demodulator. The fluctuation of the level of the signal carries the information about the identification parameters of the portable antenna module. An analog-to-digital conversion of the determine signal fluctuation is performed in an analog-to-digital converter. The converted digital signal is used for receiving data related to the type and parameters of the portable antenna module.

8 Claims, 5 Drawing Sheets

US 8,446,984 B2

METHOD AND SYSTEM FOR IDENTIFICATION OF PORTABLE ANTENNA MODULES

CROSS-REFERENCE TO RELATED APPLICATIONS

The present application is a U.S. national stage of the PCT/RU2010/000250, filed on May 19, 2010, which claims priority to Russian Patent Application No. 2010112958 filed Apr. 5, 2010), which are incorporated herein by reference in their entirety.

BACKGROUND OF THE INVENTION

1. Field of the Invention

The present invention is related to radio technology, and more particularly, to identification of portable antenna modules of radio receivers.

2. Description of the Related Art

A wide range of radio receiving devices—i.e., receivers that can work with various types of portable or removable antennas, is known. A typical example of such devices is navigation receivers. These receivers require identification of the antenna (or antenna module) used. Identification parameters of the antenna module are loaded into a microprocessor that processes radio signals. The parameters of the antenna can be, for example, antenna type, location of antenna phase center, etc.

In the U.S. Pat. No. 7,593,484 the antenna parameters are received via a radio channel or an induction connection channel. A disadvantage of this method is a need for a special additional channel for transferring data. This makes implementation difficult when both a service channel and a main data channel exist within a system. A transfer of a service data over a radio channel always requires an additional channel.

Accordingly, an improved method for identification of portable antenna modules and providing antenna parameters to the microprocessor is desired.

SUMMARY OF THE INVENTION

The present invention is intended as a method and system for identification of portable antenna modules that substantially obviates one or several of the disadvantages of the related art.

In one aspect of the invention, when a portable antenna module is connected to a system, the antenna identification parameters are automatically loaded into a microprocessor. This significantly simplifies deployment of navigation receivers and enhances efficiency of navigation measurements.

According to an exemplary embodiment, the antenna identification data is transferred over a regular channel that is normally used for transferring navigation signals (in case of the navigation receivers) or radio data streams (in case of the radio receivers). Additional modulation of the received signal is used for transferring the portable antenna parameters data.

Identification of the portable antenna modules is implemented as follows. Antenna identifications and parameters are written into a portable antenna module. The antenna module is attached to a radio receiver. The antenna module and the receiver are powered up. The portable antenna module receives radio signals that are amplified in a low-noise amplified. After transitional processes in automatic amplification control system are completed, an identification signal is generated in an identification block according to the antenna identification parameters.

Then, a level of the output signal is discretely modulated in the amplitude modulator and the signal is transferred to the radio receiver. The discrete fluctuations (in this context, changes of signal level based on an identification code) of the level of the signal are determined in the amplitude demodulator. The fluctuation of the level of the signal carries the information about the identification parameters of the portable antenna module.

An analog-to-digital conversion of the determine signal fluctuation is performed in an analog-to-digital converter. The converted digital signal is used for transferring data related to the type and parameters of the portable antenna module.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
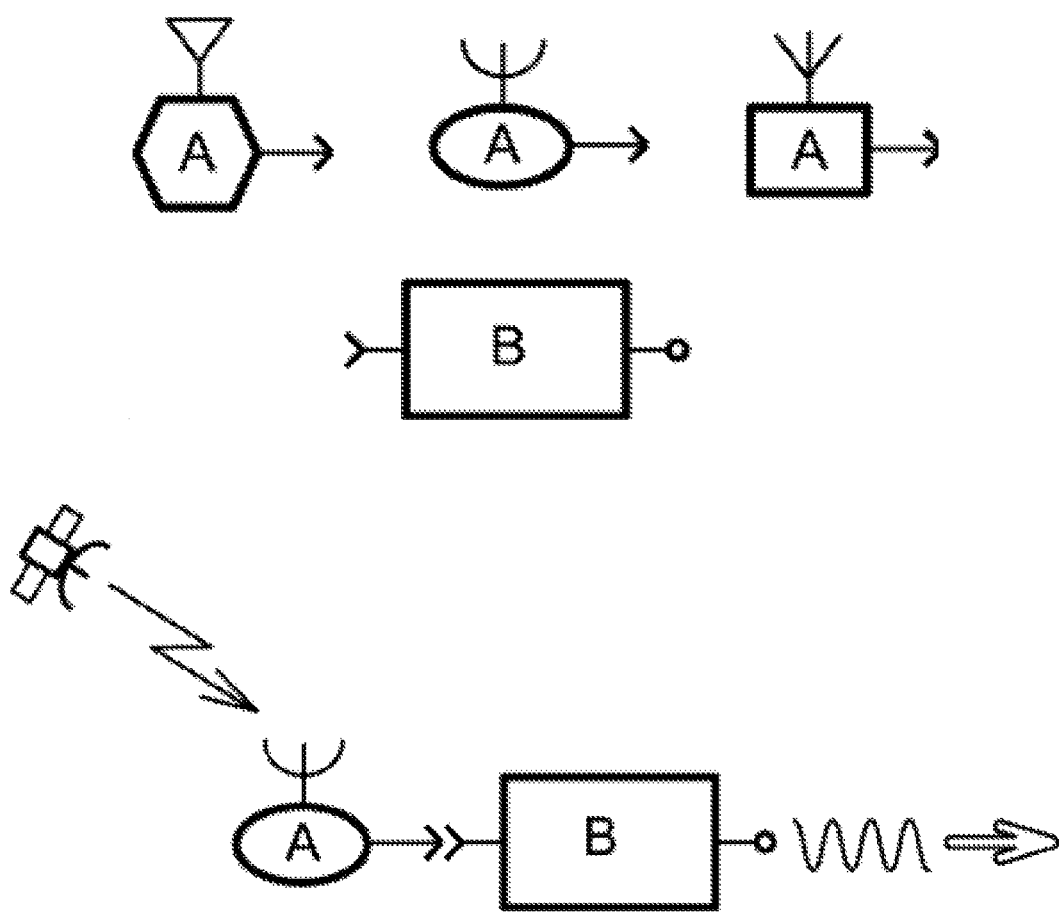
FIG. 1 illustrates schematic representation of portable antenna modules of different types that can be connected to a radio receiver, in accordance with the exemplary embodiment.

Reference will now be made in detail to the preferred embodiments of the present invention, examples of which are illustrated in the accompanying drawings.

According to the exemplary embodiment, a method and system for identification of portable antenna modules attached to the receivers are provided.

In one aspect, the antenna identifications and parameters are written into a portable antenna module. The antenna module is attached to a radio receiver. The antenna module and the receiver are powered up. The portable antenna module receives radio signals that are amplified in a low-noise amplifier and provided to an amplitude modulator.

After transitional processes in an automatic amplification control unit are completed over a time period T1, an identification signal with the duration T2 is generated in an identification block according to the antenna identification parameters. The time interval T1 is selected to be longer than the value of three time constants of the automatic amplification control unit. The time interval T2 is selected shorter than the time constant of the automatic amplification control unit.

Then, the level of the output signal is discretely modulated by the amplitude modulator and the signal is transferred to the radio receiver. The received signal is processed in the radio receiver as follows:

the signals are transformed by the high-frequency block of the receiver (for example, with a high-frequency block that includes an input amplifier, a mixing unit and an intermediate-frequency amplifier);

the signal level is controlled by the automatic amplification system (typically, AGC (automatic gain control) is a standard receiver block that provides an assigned signal level at the output in the process of changing an input signal level (mean power);

the signal is demodulated in the demodulator; and the demodulated signal is processed in the microprocessor.

The received signal can be filtered (see discussion above) and a signal range can be transformed into intermediate frequency range by the high-frequency block.

Then, the discrete fluctuations of the level of the signal are determined in the amplitude demodulator. The fluctuation of the level of the signal carries the information about the identification parameters of the portable antenna module.

An analog-to-digital conversion of the determined signal fluctuation is performed in an analog-to-digital converter. The converted digital signal is used for receiving data related to the type and parameters of the portable antenna module. The type and parameter data is used for digital processing of the demodulated signal in the microprocessor.

According to the exemplary embodiment, the system for identification of portable antennas includes a portable (replaceable) antenna module and a radio signal receiving device. The output of the portable antenna module is connected to the input of the receiving device and the output of the receiving device is the output of the entire system.

A portable antenna module includes a receiving antenna, a low-noise amplifier, an amplitude modulator and an identification signal generation block. The first input of the amplitude modulator is connected to the output of the low-noise amplifier. The second input of the amplitude modulator is connected to the output of the identification signal generation block and the output of the amplitude modulator serves as the output of the portable antenna module.

The radio receiver, in accordance to the exemplary embodiment, includes a high-frequency block, an automated amplification control unit, a demodulator, and a microprocessor. These devices are connected in series. It also includes an amplitude demodulator and an analog-to-digital converter. The input of the amplitude demodulator is connected to the output of the automated amplification control system. The fact is that a high-frequency block, an automated amplification control unit, a demodulator, a microprocessor are connected in series. An amplitude demodulator and an ADC are also connected in series. These two "groups" of elements are connected in parallel. The input of the analog-to-digital converter is connected to the output of the amplitude demodulator. The output of the analog-to-digital converter is connected to the second input of the microprocessor. The input of the high-frequency block serves as the input of the radio receiver and the output of the microprocessor serves as the output of the radio receiver. (please delete strikethrough words out of the text)

FIG. 1 illustrates schematic representation of portable antenna modules of different types that can be connected to a radio receiver, in accordance with the exemplary embodiment. Three antenna modules A of different types can be connected to a radio receiver B. As shown in FIG. 1, the antennas A can receive and process signals from a navigational satellite, such as GPS, GLONASS, GALILEO, etc.

Figure 2:
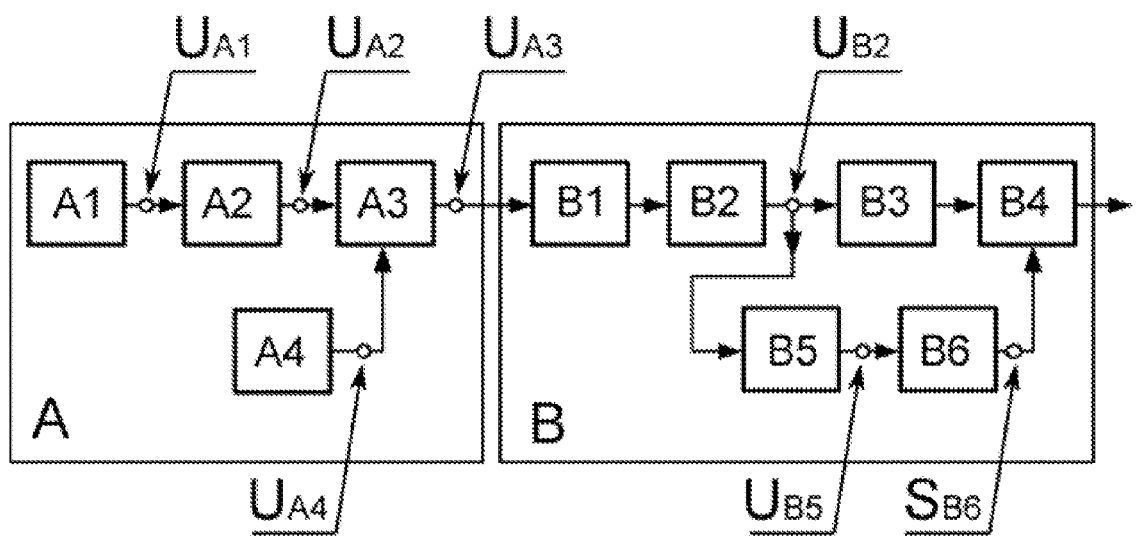
FIG. 2 illustrates a functional diagram of a system, in accordance with the exemplary embodiment.

FIG. 2 illustrates a functional diagram of a system, in accordance with the exemplary embodiment. A portable antenna module A includes an antenna unit A1 that has an output $U_{A1}$, a low-noise amplifier A2 that has an output $U_{A2}$, an amplitude modulator A3 that has an output $U_{A3}$, an identification signal generation block A4 that has an output $U_{A4}$. A radio receiver B includes a high-frequency block B1, an automated amplification control unit B2 that has an output $U_{B2}$, a demodulator B3, a microprocessor B4, an amplitude demodulator B5 that has an output $U_{B5}$ and an analog-to-digital converter B6 that outputs code $S_{B6}$.

Figure 3:
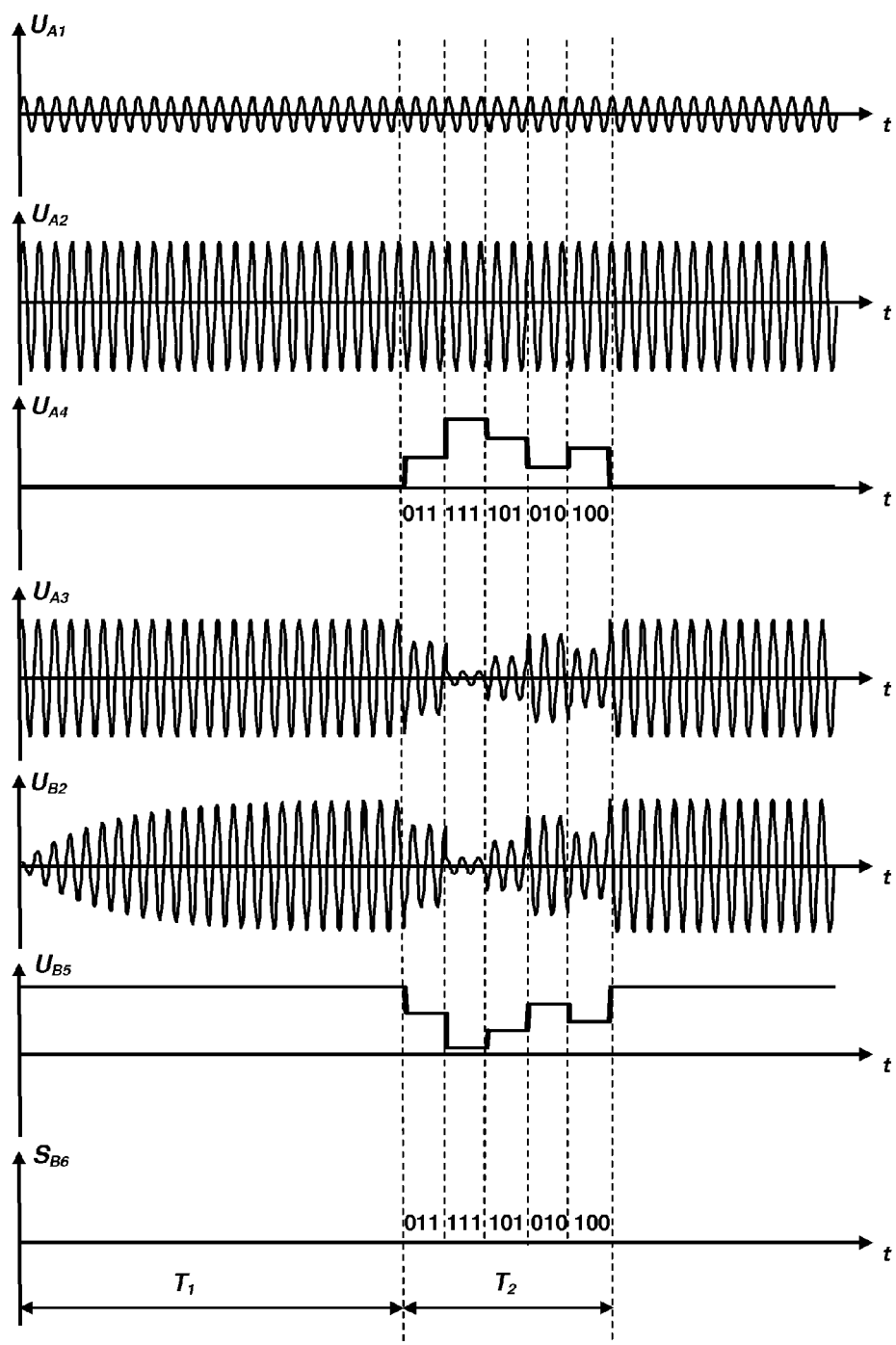
FIG. 3 illustrates output signals of devices included in the system, in accordance with the exemplary embodiment.

FIG. 3 illustrates output signals of devices included in the system depicted in FIG. 2. A graph $U_{A1}$ depicts a signal at the output of the receiving antenna A1. A graph $U_{A2}$ depicts a signal at the output of the low-noise amplifier A2. A graph $U_{A3}$ depicts a signal at the output of the amplitude modulator A3. A graph $U_{A4}$ depicts a signal at the output of the identification signal generation block A4. A graph $U_{B2}$ depicts a signal at the output of the automated amplification control unit B2. A graph $U_{B5}$ depicts a signal at the output of the amplitude demodulator B5. A diagram $S_{B6}$ depicts an output code produced by the analog-to-digital converter B6. These graphs illustrate operational principles of the system described herein and give an example of its operation.

Figure 4:
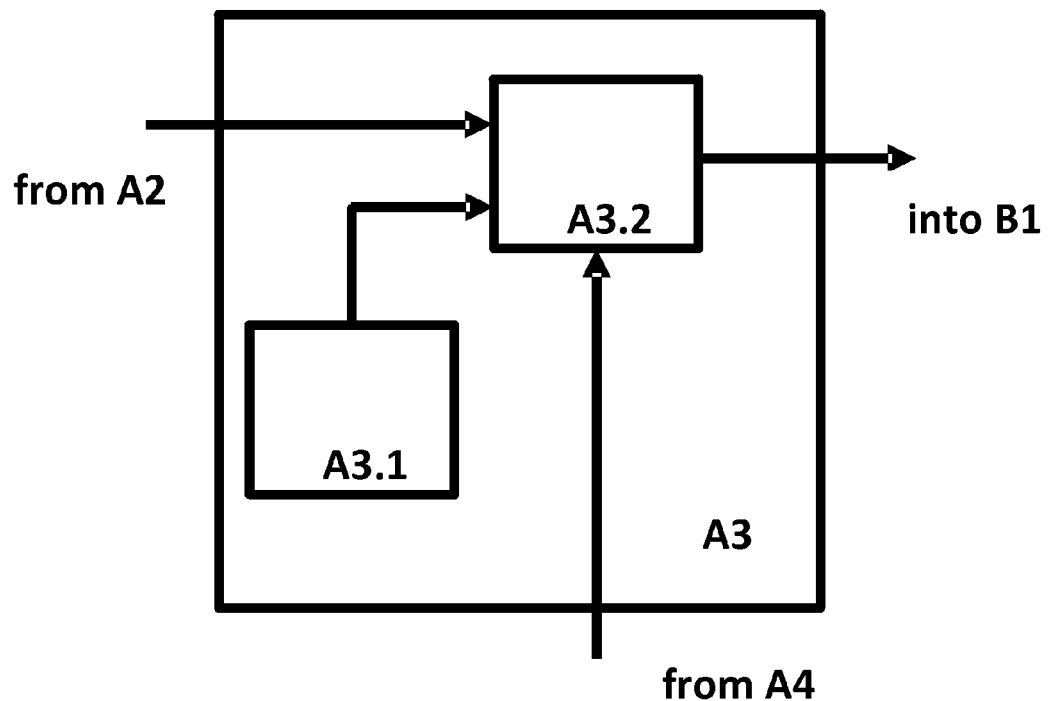
FIG. 4 illustrates an amplitude modulator, in accordance with the exemplary embodiment.

FIG. 4 illustrates an amplitude modulator, in accordance with the exemplary embodiment. The amplitude modulator A3 includes a nominal resistance A3.1 implemented, for example, as a 50 Ohm resistor and a commutation unit (switch) A3.2 with two signal inputs, one control input and one signal output. The nominal resistance A3.1 is connected to one of the signal inputs of the commutation unit A3.2. The second signal input of the commutation unit A3.2 is connected to the output of LNA (A2). The control input of the commutation unit A3.2 is connected to the output of the identification signal generation module (A4). The output of the commutation unit A3.2 is connected to the input of the high-frequency block (B1).

Figure 5:
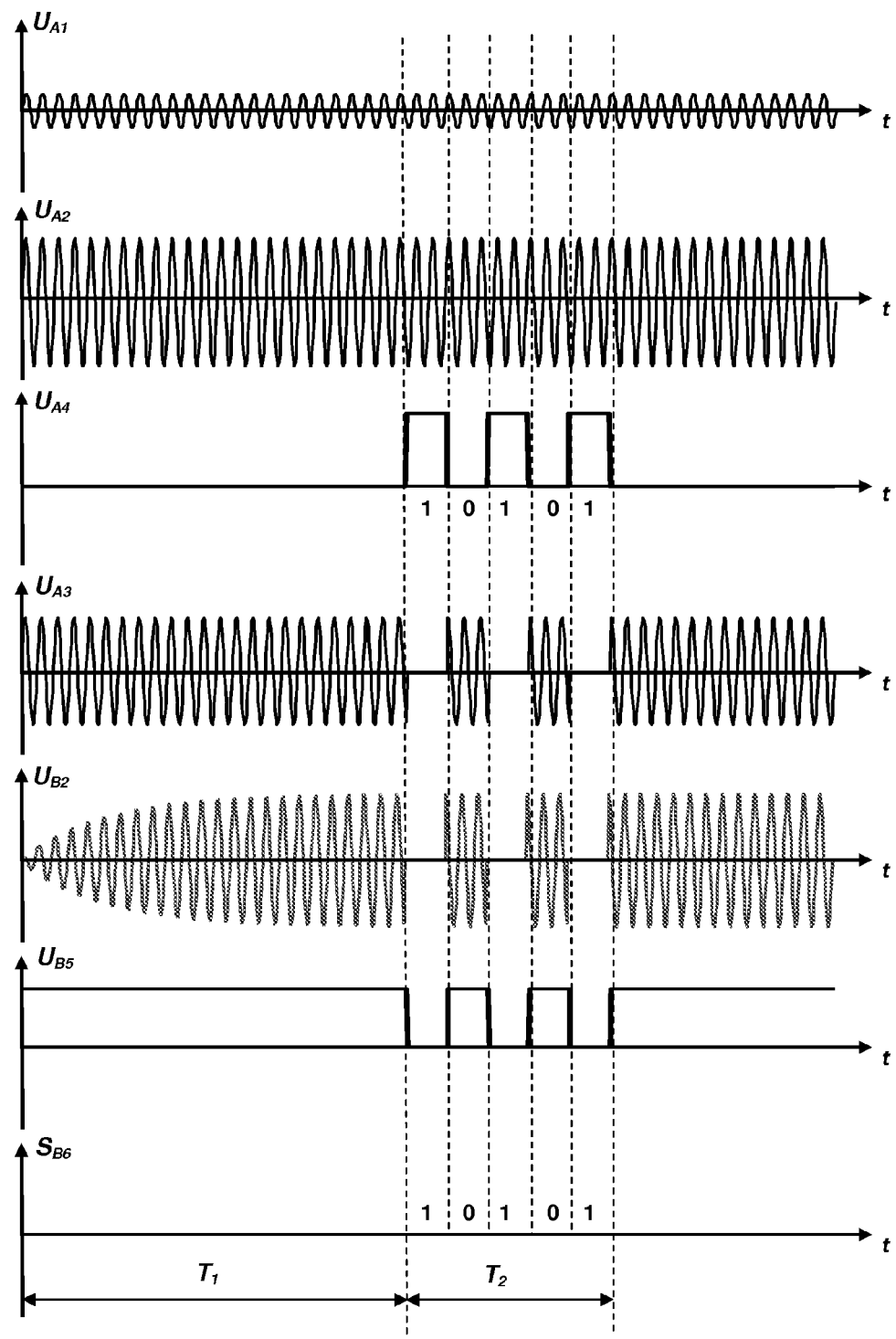
FIG. 5 illustrates device output using binary amplitude modulation, in accordance with the exemplary embodiment.

FIG. 5 illustrates device output signals using binary amplitude modulation, in accordance with the exemplary embodiment. A graph $U_{A1}$ depicts an output signal of the receiving antenna A1. A graph $U_{A2}$ depicts an output signal of the low-noise amplifier A2. A graph $U_{A4}$ depicts an output signal of the identification signal generation block A4. This signal corresponds to an identification code. A graph $U_{A3}$ depicts a signal at the output of the amplitude modulator A3.

A graph $U_{B2}$ depicts an output signal of the automated amplification control unit B2. A graph $U_{B5}$ depicts a signal at the output of the amplitude demodulator B5. A diagram $S_{B6}$ depicts an output discrete code produced by the analog-to-digital converter B6 (i.e., a binary quantizer).

The identifiers and parameters are pre-recorded into a portable antenna module. The portable antenna module is connected to the radio receiving equipment (i.e., a receiver). The antenna and the receiver are powered up.

A radio signal is received by the receiving antenna (A1). An exemplary form of the received signal at the output of the receiving antenna is shown in graph $U_{A1}$ (FIG. 3). The received signal is amplified in the low-noise amplifier, LNA (A2) provided to the input of an amplitude modulator (A3). An exemplary form of the signal at the output of LNA is shown in FIG. 3, graph $U_{A2}$.

Signal identification generation unit (A4) forms an identifying signal according to antenna identification data. Duration T2 of this signal is selected smaller than the time constant of the automatic amplification control unit (B2). An exemplary form of the signal at the output of the identification generation unit (A4) and its correlation with the identification code are shown in FIG. 3, graph $U_{A4}$. This graph shows what a signal generated by the identification generation unit (A4) can look like, and illustrates and demonstrates the operability of the proposed technical solution.

The identification signal and the signal output from the LNA (A2) are fed into the amplitude modulator (A3) that modulates the level of the output signal of the LNA (A2). An approximate form of the modulated signal is shown in FIG. 3, graph $U_{A3}$. The modulated signal is processed in the high-frequency block of the radio receiver unit (B1). For example, the modulated signal is filtered and the signal range is transferred into the intermediate frequencies range.

The system of automatic amplification control (B2) controls an average signal level. After this, the resulting signal is simultaneously fed to the input of the demodulator (B3) and to the amplitude demodulator (B5). An exemplary form of the signal at the output of the automatic amplification control unit (B2) is shown in FIG. 3, graph $U_{B2}$. These graphs illustrate the operational principle of the proposed invention and give an example of its operability.

The signal is demodulated in the demodulator (B3) and sent to the microprocessor (B4). Fluctuations of the signal level are identified in the amplitude demodulator (B5). An exemplary form of the output signal from the amplitude demodulator is shown in FIG. 3, graph $U_{B5}$. These graphs illustrate the operational principle of the proposed invention and give an example of its operability.

The analog-to-digital converter (B6) generates a discrete code corresponding to the type and parameters of the connected removable antenna module (A), by quantizing the input signal by level. An approximate form of the generated code is shown in FIG. 3, diagram $S_{B6}$.

The signal demodulated in the demodulator (B3) and the resulting discrete code from the analog-to-digital converter (B6) are sent to the microprocessor (B4), which processes the signal according to the type and parameters of the connected removable antenna module (A).

In one exemplary embodiment, the modulation of the signal in the amplitude modulator (A3) employs switching between the output of the LNA (A2) and the resistance in accordance with the identification signal. For example, a transistor can be used as a switch. An exemplary amplitude modulator is shown in FIG. 4. In this embodiment, the analog-to-digital conversion performed in the analog-to-digital converter (B6) is executed as a binary two-level quantization of the original signal (i.e., a signal—no signal scheme). An exemplary form of the signal for this case is shown in FIG. 5.

A portable antenna module includes the following units connected sequentially: a receiving antenna (A1); a low-noise amplifier (A2), such as, for example, a band-pass amplifier with the required bandwidth; an amplitude modulator (A3) that can be implemented, for example, as an electrically controlled diode or a ferrite attenuator; an identification signal generation block implemented as a generator of a multi-positional impulse amplitude-modulated signal (multi-level PCM signal) that can initiate the generation of the identifying signal with a delay after power-on moment by the interval T1 and generate this signal during a time interval T2. Blocks A1 and A2 are also intended for receiving the desired radio signal. After modulation of the received signal based on the identification code, block A3 does not affect the received signal.

The first input of the amplitude modulator (A3) is connected to the output of the low-noise amplifier (A2). The second input of the amplitude modulator is connected to the output of the identification signal generation block (A4) and the output of the amplitude modulator is connected to the output of the high-frequency block (B1).

In order to provide minimal distortion of the signal as it passes through the automatic amplification control unit (B2), the time interval T2 is chosen smaller than the time constant of the automatic amplification control unit (B2).

According to the exemplary embodiment, the radio receiver (B) includes the following units connected sequentially: a high-frequency block (B1) capable of signal filtering transferring the signal range into mid frequency range; an automated amplification control unit (B2) capable of maintaining constant medium (or peak level) signal level at its output (a dynamic range of the fluctuation of the output signal of the automated amplification control unit (B2) corresponds to a dynamic range of the demodulator (B3) and the amplitude demodulator (B5) that follow it); the demodulator (B3) capable of defining a useful binary signal out of the resulting signal; an amplitude demodulator (B5); an analog-to-digital converter (B6); the microprocessor (B4) capable of processing the received useful signal and calculating the current coordinates of the phase center of the receiving antenna.

The input of the amplitude demodulator (B5) is connected to the output of the automated amplification control unit (B2). The output of the analog-to-digital converter (B6) is connected to the second input of the microprocessor (B4). The output of the microprocessor (B4) serves as the output of the entire system. Note in particular the use of blocks B5 and B6 and their connections.

Digital signal processing is started in the microprocessor (B4) upon expiration of the time interval T1+T2 required for completion of the transitional processes after the power-on and transition of the portable antenna identification signal.

In one embodiment, a useful signal can be absent at the input of the receiving antenna (A1). In this case, a maximum signal level at the output of the portable antenna module is equal to noise level at the output of the LNA (A2) and a minimal signal level is equal to the noise level of the nominal resistance. Since the LNA (A2) is loaded by the nominal resistance, its output noise level is larger by at least its amplification coefficient than a corresponding noise level at its input.

In modern LNAs the amplification coefficient can be from one to tens of decibels. Thus, the relationship between minimum and maximum level of the modulated signal is also in the range from one to tens. This range is sufficient for stable functioning of the analog-to-digital converter (B6) even when the useful signal is absent at the input of the receiving antenna.

Those skilled in the art will appreciate that proposed system and method allow for receiving, by the radio receivers, the identification data of the portable antenna modules without noticeable effects on functionality of the main channel transmitting the useful signal and without using an additional channel for transmitting the identification codes of the portable antenna modules.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

The invention claimed is:

1. A method for identification of a portable antenna module, the method comprising:

(a) writing antenna identifiers and parameters into the portable antenna module;
(b) connecting the antenna module to a radio receiver;
(c) powering up the receiver;
(d) receiving a signal;
(e) amplifying the received signal in an amplifier;
(f) pausing for completion of transitional processes;
(g) converting a frequency of the signal in the receiver to a lower frequency;
(h) controlling a signal level in an automatic amplification control module;
(i) demodulating the signal in a demodulator; and
(j) performing analog-to-digital conversion of the signal in an analog-to-digital converter,
wherein:
(k) the amplified received signal is fed into an amplitude modulator;
(l) an identification signal is generated in an identification signal generation unit based on the antenna identifiers and fed to the amplitude modulator;
(m) an output signal is modulated in the amplitude modulator;
(n) the modulated output signal is processed in the high-frequency block;
(o) the automatic amplification control module controls an amplitude of the modulated output signal and feeds it into an input of a demodulator and into an input of an amplitude demodulator;
(p) the demodulator demodulates the modulated output signal and the amplitude demodulator simultaneously determines fluctuations of the modulated output signal level;
(q) the analog-to-digital converter generates a discrete code corresponding to the antenna parameters based on the signal level fluctuations;
(r) the demodulated signal and the discrete code are provided to a microprocessor; and
(s) the microprocessor processes the demodulated signal based on the parameters of the antenna module.

2. The method of claim 1, wherein the modulation of the output signal level from the amplifier is executed by switching between an output of the amplifier and a nominal resistance based on the identification signal.

3. The method of claim 1, wherein the analog-to-digital conversion uses binary quantization.

4. A system for identification of a portable antenna module, the system comprising:
the portable antenna module comprising a receiving antenna, a low noise amplifier, an amplitude modulator, and an identification signal generation block connected to the amplitude modulator;
a radio receiver connected to the portable antenna module, wherein the radio receiver comprises a high-frequency block, an automatic amplification control unit, a demodulator, a microprocessor connected in series, and an amplitude demodulator, and an analog-to-digital converter connected in series,
wherein an input of the amplitude demodulator is connected to an output of the automatic amplification control unit; and
wherein an output of the analog-to-digital converter is connected to a second input of the microprocessor, and
wherein input of the analog-to-digital converter is connected to the output of the amplitude demodulator.

5. The system of claim 4, wherein the amplitude modulator of the portable antenna module is a commutation unit connected to a nominal resistance, to the output of the low noise amplifier and to the identification signal generation block.

6. The system of claim 4, wherein the analog-to-digital converter of the radio receiver is a binary quantizer.

7. The system of claim 6, wherein the commutation unit includes two signal inputs, one control input and one signal output, wherein the nominal resistance is connected to one of the signal inputs of the commutation unit, the second signal input is connected to an output of the low noise amplifier and wherein the control input of the commutation unit is connected to an output of the identification signal generation block and the signal output of the commutation unit is connected to an input of the high frequency block.

8. A method for identification of a portable antenna module, the method comprising:
(a) writing antenna parameters into the portable antenna module;
(b) receiving a signal;
(c) amplifying the received signal;
(d) converting a frequency of the amplified signal to a lower frequency;
(e) controlling a level of the amplified signal;
(f) demodulating the amplified signal; and
(g) performing analog-to-digital conversion of the demodulated signal,
wherein:
(h) an identification signal is generated based on the antenna parameters;
(i) the amplified received signal is modulated and shifted to the lower frequency;
(j) an amplitude of the modulated amplified received signal is regulated;
(k) the modulated amplified received signal is demodulated and fluctuations of the modulated amplified received signal level are determined;
(l) a discrete code is generated corresponding to the antenna parameters based on the fluctuations; and
(m) based on the antenna parameters and the discrete code, the portable antenna module is identified.

* * * * *